(12) United States Patent
Chang et al.

(10) Patent No.: US 10,817,178 B2
(45) Date of Patent: Oct. 27, 2020

(54) COMPRESSING AND COMPACTING MEMORY ON A MEMORY DEVICE WHEREIN COMPRESSED MEMORY PAGES ARE ORGANIZED BY SIZE

(71) Applicant: Hewlett Packard Enterprise Development LP, Houston, TX (US)

(72) Inventors: Jichuan Chang, Palo Alto, CA (US); Sheng Li, Palo Alto, CA (US); Parthasarathy Ranganathan, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 649 days.

(21) Appl. No.: 15/032,327

(22) PCT Filed: Oct. 31, 2013

(86) PCT No.: PCT/US2013/067757
§ 371 (c)(1),
(2) Date: Apr. 27, 2016

(87) PCT Pub. No.: WO2015/065427
PCT Pub. Date: May 7, 2015

(65) Prior Publication Data
US 2016/0253105 A1    Sep. 1, 2016

(51) Int. Cl.
*G06F 3/06* (2006.01)
(52) U.S. Cl.
CPC ............ *G06F 3/0608* (2013.01); *G06F 3/064* (2013.01); *G06F 3/0673* (2013.01)

(58) Field of Classification Search
CPC .................................................. G06F 2212/401
See application file for complete search history.

(56) References Cited

U.S. PATENT DOCUMENTS

| 5,546,575 A * | 8/1996 | Potter ............... G06F 17/30595 |
| 6,349,150 B1 * | 2/2002 | Jones ...................... H03M 7/30 375/E7.093 |
| 6,452,602 B1 * | 9/2002 | Morein ............... H04N 19/176 345/536 |
| 6,480,835 B1 | 11/2002 | Light |

(Continued)

FOREIGN PATENT DOCUMENTS

EP    0976045 B1    4/2002

OTHER PUBLICATIONS

Alameldeen, A.R. et al., "Adaptive Cache Compression For High-Performance Processors", (Research Paper), Proceedings of the 31st Annual International Symposium on Computer Architecture, May 27, 2012, 12 pages.

(Continued)

*Primary Examiner* — Reginald G Bragdon
*Assistant Examiner* — Chie Yew
(74) *Attorney, Agent, or Firm* — Fabian VanCott (57) ABSTRACT

A method for compressing and compacting memory on a memory device is described. The method includes organizing a number of compressed memory pages referenced in a number of compaction table entries based on a size of the number of compressed memory pages and compressing the number of compaction table entries, in which a compaction table entry comprise a number of fields.

13 Claims, 6 Drawing Sheets

(56) References Cited

U.S. PATENT DOCUMENTS

| | | | | |
|---|---|---|---|---|
| 8,862,837 | B1* | 10/2014 | Marshak | G06F 12/0868 |
| | | | | 711/154 |
| 8,935,493 | B1* | 1/2015 | Dolan | G06F 3/0649 |
| | | | | 711/117 |
| 2002/0073298 | A1 | 6/2002 | Geiger et al. | |
| 2003/0149700 | A1* | 8/2003 | Bolt | G06F 11/1456 |
| 2003/0188121 | A1 | 10/2003 | Roy et al. | |
| 2005/0114600 | A1 | 5/2005 | Citron | |
| 2005/0283711 | A1* | 12/2005 | Claseman | G06F 17/30949 |
| | | | | 714/759 |
| 2007/0106876 | A1* | 5/2007 | Goswami | G06F 17/30336 |
| | | | | 711/216 |
| 2010/0250864 | A1 | 9/2010 | Carty | |
| 2010/0316114 | A1* | 12/2010 | Fallon | H03M 7/30 |
| | | | | 375/240 |
| 2012/0203955 | A1* | 8/2012 | Kim | G06F 12/0246 |
| | | | | 711/103 |
| 2012/0290798 | A1 | 11/2012 | Huang et al. | |
| 2013/0073798 | A1* | 3/2013 | Kang | G06F 12/0246 |
| | | | | 711/103 |

OTHER PUBLICATIONS

Baek, S. et al.,"A Dual-phase Compression Mechanism For Hybrid Dram/PCM Main Memory Architectures", (Research Paper), May 3-4, 2012, 6 pages.

Dilger, D.E., Compressed Memory in OS X 10.9 Mavericks aims to free RAM, extend battery life, (Research Paper), Jun. 13, 2013, 6 Pages.

Lawrence, L, et al., "PRESIDIO: A Framework For Efficient Archival Data Storage", (Research Paper), Jul. 2012, 60 pages.

Lim, K. et al., "Disaggregated Memory For Expansion And Sharing In Blade Servers", (Research Paper), Jun. 20-24, 2009, 12 pages.

PCT Search Report/Written Opinion~Application No. PCT/US2013/067757 dated Aug. 4, 2014~13 pages.

Yang, L. et al., "Online Memory Compression For Embedded Systems", (Research Paper), Feb. 2010, 30 pages.

Cooper-Balis et al., "Buffer-On-Board Memory Systems" ISCA '12 Proceedings of the 39th Annual International Symposium on Computer Architecture, Sep. 2012, pp. 1-12.

Ekman et al., "A Robust Main-Memory Compression Scheme", ISCA '05 Proceedings of the 32nd annual international symposium on Computer Architecture, May 2005, 12 pages.

Intel, "Intel® 7500/7510/7512 Scalable Memory Buffer," Datasheet, Apr. 2011, pp. 1-40.

Joseph et al., "Prefetching Using Markov Predictors", ISCA '97 Proceedings of the 24th annual international symposium on Computer architecture, vol. 25, Issue 2, 1997, pp. 252-263.

Pekhimenko et al., "Linearly Compressed Pages: A Main Memory Compression Framework with Low Complexity and Low Latency", PACT 2012 Student Research Competition, Sep. 19-23, 2012, 1 page.

* cited by examiner

COMPRESSING AND COMPACTING MEMORY ON A MEMORY DEVICE WHEREIN COMPRESSED MEMORY PAGES ARE ORGANIZED BY SIZE

BACKGROUND

Memory devices are used to store data. For example, data centers may use memory devices to store large amounts of data. The memory may be compressed and stored on the devices to provide more storage space for even more data. Compaction tables are used to index where compressed memory data is located.

BRIEF DESCRIPTION OF THE DRAWINGS

The accompanying drawings illustrate various examples of the principles described herein and are a part of the specification. The illustrated examples do not limit the scope of the claims.

Throughout the drawings, identical reference numbers designate similar, but not necessarily identical, elements.

DETAILED DESCRIPTION

As described above, data centers, among other entities, may process large amounts of data and may use memory systems to store the data. Data may be stored on a memory system in chunks. Data chunks may provide security and address protection. Actual access to the data chunks may be granted using smaller granularity units referred to as memory pages.

Generally, data can be compressed such that more data may be stored on a given memory device. Compressing data may reduce the amount of space used to store a given piece of data in the memory device, leaving spare, unused space on the memory device. Compaction may then allow the spare space to be used for storing more data. Accordingly, a compaction table may be used to indicate compressed data size and data location in the memory device, and an indication of the compression process used to compress the data, among other compression metadata. While current methods for data compression may be beneficial, many complications exist that reduce the efficiency of data compression.

For example, compaction table entries themselves are a form of data, and as such take up valuable space in a memory device. Accessing compressed data may include accessing the compaction table to identify the location of the compressed data and to also indicate how to decompress the compressed data. Moreover, computing an offset for a page may be complex to implement and may inhibit data access performance.

Accordingly, the present disclosure describes systems and methods for compressing and compacting memory in a memory device to overcome the above mentioned complications among other complications. The present disclosure describes systems and methods to provide memory compression and compaction functionalities from a memory device, independent from, and transparent to, a processor or host.

To achieve the improved compression and compaction, the systems and methods describe 1) reducing the size of compaction table entries using compaction table compression, 2) arranging the data to improve the compaction table compression ratio and 3) selecting a compression size to improve the compaction table compression ratio. Furthermore, the systems and methods improve compression and compaction by managing compression based on memory device usage. More particularly, compression may be delayed when the memory device is frequently accessed. Similarly, a compression process may be selected based on whether or not the memory device, or a section of memory, is likely to be accessed frequently.

The present disclosure describes a method for compressing and compacting memory on a memory device. The method may include organizing a number of compressed memory pages referenced in a number of compaction table entries based on a size of the number of compressed memory pages. The method may also include compressing a number of the compaction table entries. Each compaction table entry may include a number of fields.

The present disclosure describes a system for compressing and compacting memory on a memory device. The system may include a memory module to store a compaction table, compressed data, uncompressed data, or combinations thereof. The system may also include a compression engine to compress and decompress data stored in memory and organize memory pages represented in a compaction table. The system may also include a compression controller to schedule data compression and data decompression based on memory device usage.

The present disclosure describes a computer program product for compressing and compacting memory on a memory device. The computer program product may include a computer readable storage medium which may include computer usable program code embodied therewith. The computer usable program code may include computer usable program code to, when executed by a processor, schedule data compression and decompression based on memory device usage, group compressed memory pages of the same size together, in which the memory pages are represented in a compaction table, resize a number of memory pages to the same size, and compress a number of fields of a compaction table entry. As used herein, a processor may be a central processing unit (CPU), a graphics processing unit (GPU), a field-programmable gate array (FPGA), a fixed-function application-specific integrated circuit (ASIC), or other computational element.

The systems and methods described herein may be beneficial by providing host-transparent memory compaction and compression. Moreover, the systems and methods described herein may be implemented with existing virtual memory page tables, translation look-a-side buffers (TLB), operating systems, or file systems, without any modifications to these components. Moreover, the systems and methods described herein allow for high compression and decompression performance with reduced latency overhead. Still further, the systems and methods described herein may reduce offset calculation complexity and generate uniform compaction table entries that are more compressible and easier to process.

As used in the present specification and in the appended claims, the term "chunk" may refer to a unit of memory storage that includes a number of smaller units of memory storage. For example, a memory blade may include a number of memory chunks. The memory chunk may include a number of smaller memory units such as memory pages. Any size chunk may be implemented in accordance with the systems and methods described herein.

Similarly, as used in the present specification and in the appended claims, the term "page" may refer to a unit of memory storage included within a memory chunk. Data within a page may be compressed using a similar compression process. For example, a number of memory pages may be included in a memory chunk. Again, any size page may be implemented in accordance with the systems and methods described herein.

Further, as used in the present specification and in the appended claims, the term "entry" may refer to a portion of a compaction table that includes metadata for a piece of memory. For example, a compaction table entry may indicate the location of pages in a chunk, the size of pages in a chunk, and a compression process used on pages in a chunk, among other metadata relating to memory chunks, memory pages, or combinations thereof.

Still further, as used in the present specification and in the appended claims, the term "a number of" or similar language may include any positive number including 1 to infinity; zero not being a number, but the absence of a number.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figure 1:
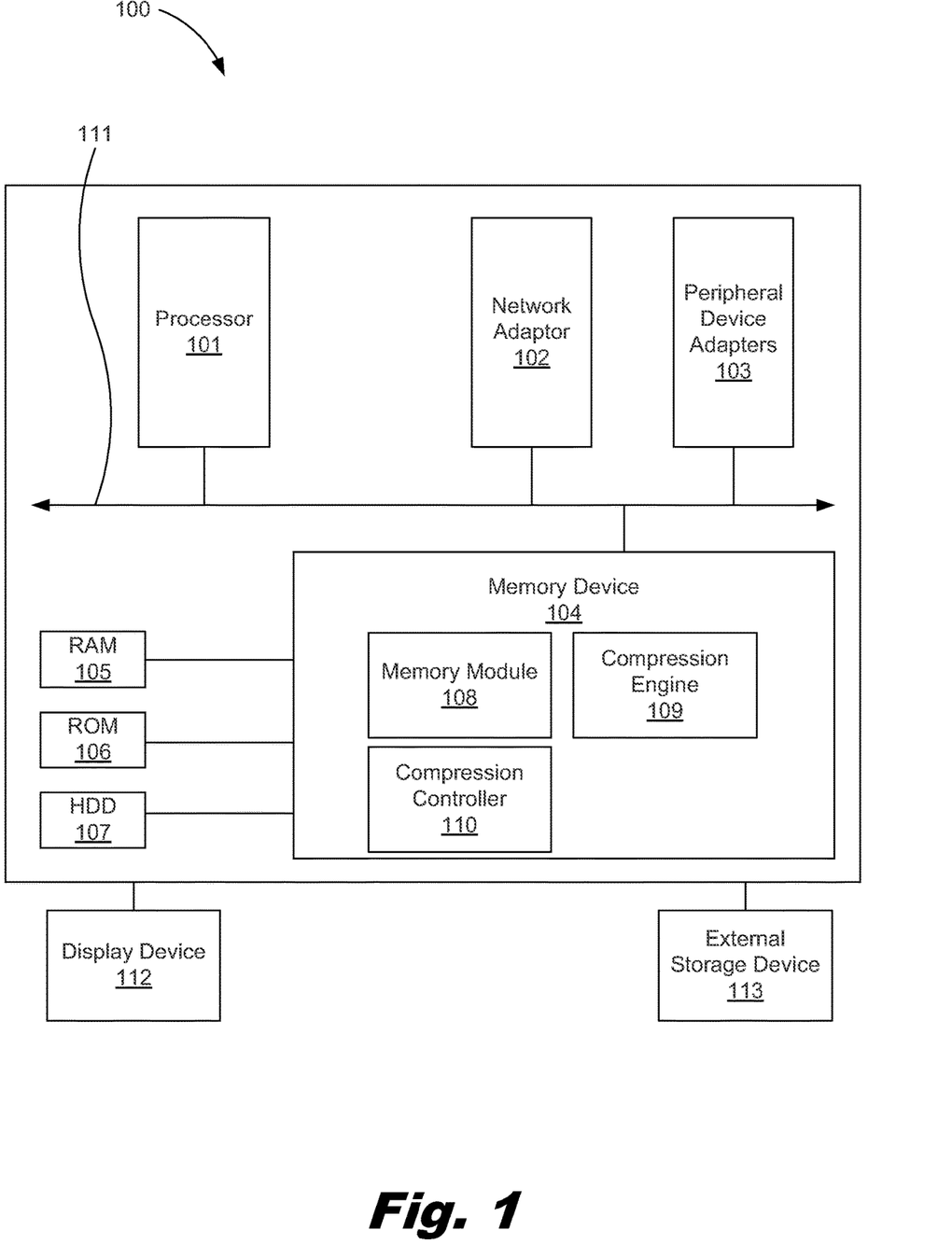
FIG. 1 is a diagram of a system for compressing and compacting memory in a memory device, according to one example of the principles described herein.

FIG. 1 is a diagram of a system (100) for compressing and compacting memory in a memory device, according to one example of the principles described herein. The system (100) may be utilized in any data processing scenario including, for example, a cloud computing service such as a Software as a Service (SaaS), a Platform as a Service (PaaS), a Infrastructure as a Service (IaaS), application program interface (API) as a service (APIaaS), other forms of network services, or combinations thereof. Further, the system (100) may be used in a public cloud network, a private cloud network, a hybrid cloud network, other forms of networks, or combinations thereof. In one example, the methods provided by the system (100) are provided as a service over a network by, for example, a third party. In another example, the methods provided by the system (100) are executed by a local administrator.

Further, the system (100) may be utilized within a single computing device. In this data processing scenario, a single computing device may utilize the hierarchical dictionary and other associated methods described herein to scan, store, and/or transmit compressed versions of single or multi-page documents.

To achieve its desired functionality, the system (100) comprises various hardware components. Among these hardware components may be a number of processors (101), a memory device (104), a number of peripheral device adapters (103), and a number of network adapters (102). These hardware components may be interconnected through the use of a number of busses and/or network connections. In one example, the number of busses that interconnect a number of these devices may be represented by the reference numeral (108). In other words, the reference number (108) may designate a connection and may not indicate a particular number of connections. For example, the memory device (104) may be connected to a number of other elements in the system (100) and may use a bus distinct from a bus used by the peripheral device adapters (103) to communicate with other elements of the system (100).

The processor (101) may include the hardware architecture to retrieve executable code from the memory device (104) and execute the executable code. The executable code may, when executed by the processor (101), cause the processor (101) to implement at least the functionality of memory compression and compaction, according to the methods of the present specification described herein. In the course of executing code, the processor (101) may receive input from and provide output to a number of the remaining hardware units.

The memory device (104) may store data such as executable program code that is executed by the processor (101) or other processing device. As will be discussed, the memory device (104) may specifically store a number of applications that the processor (101) executes to implement at least the functionality described herein.

The memory device (104) may be coupled to or include, various types of memory, including volatile and nonvolatile memory, or combinations thereof. For example, the memory device (104) of the present example may be coupled to Random Access Memory (RAM) (105), Read Only Memory (ROM) (106), and Hard Disk Drive (HDD) memory (107). Many other types of memory may also be utilized, and the present specification contemplates the use of many varying type(s) of memory as may suit a particular application of the principles described herein. In certain examples, different types of memory may be used for different data storage needs. For example, in certain examples the processor (101) may boot from Read Only Memory (ROM) (106), maintain nonvolatile storage in the Hard Disk Drive (HDD) memory (107), and execute program code stored in Random Access Memory (RAM) (105).

Generally, the memory device (104) may comprise a computer readable medium, a computer readable storage medium, or a non-transitory computer readable medium, among others. For example, the memory device (104) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. In another example, a computer readable storage medium may be any non-transitory medium that can contain, or store a program for use by or in connection with an instruction execution system, apparatus, or device.

The hardware adapters (103) in the system (100) enable the processor (101) to interface with various other hardware elements, external and internal to the system (100). For example, peripheral device adapters (103) may provide an interface to input/output devices, such as, for example, display device (112) or access other external devices such as an external storage device (113). The display device (112) may be provided to allow a user to interact with and implement the functionality of the system (100). The peripheral device adapters (103) may also create an interface between the processor (101) and a printer, the display device (112), or other media output device. The network adapter (102) may provide an interface to other computing devices within, for example, a network, thereby enabling the transmission of data between the system (100) and other devices located within the network.

The system (100) further comprises a number of modules used in the creation of a number of hierarchical dictionaries and in binary document image compression. The various modules within the system (100) may be executed separately. In this example, the various modules may be stored as separate computer program products. In another example, the various modules within the system (100) may be combined within a number of computer program products; each computer program product comprising a number of the modules.

The system (100) may include a memory module (108). The memory module (108) may store a compaction table. As will be described below, the compaction table may include metadata relating to compressed data stored in the memory module (108). More particularly, the compaction table may include metadata relating to memory chunks in the memory module (108). The memory module (108) may store compressed data that has been compressed using a number of compression processes. For example, one portion of the compressed data may have been compressed using a quicker, less comprehensive compression process while another portion of the compressed data may have been compressed using a slower, more comprehensive compression process. More detail concerning the compressed data is given below in connection with at least FIGS. 2 through 4.

The memory module (108) may also store uncompressed data. The memory module (108) may store any combination of compressed and uncompressed data. For example, a user may direct the memory module (108) to operate with compression disabled. With compression disabled, the memory module (108) may store uncompressed data. The user may also direct the memory module (108) to operate with compression enabled. When compression is enabled, the memory module (108) may store compressed data, uncompressed data or combinations thereof. More detail concerning the memory module (108) operation and communication with the compression engine (109) and the compression controller (110) is given below in connection with FIG. 5.

The memory device (104) may also include a compression engine (109) to compress and decompress data stored in memory. The compression engine (109) may compress and decompress data stored in memory based on a number of different processes. For example, for memory pages that are accessed more frequently, the compression engine (109) may compress and decompress the data using a quicker compression process to decrease latency of the frequently-accessed memory. By comparison, for memory pages that are not as frequently accessed, the compression engine (109) may compress and decompress the data using a more thorough compression process.

The compression engine (109) may compress and decompress data using different granularities. An example is given as follows. Data may be stored to memory in 16 Megabyte (MB) chunks. In this example, the compression engine (109) may operate on a smaller granularity, for example 4 Kilobytes (KB). Accordingly, the compression engine (109) may compress and decompress a portion of the chunk, without compressing and decompressing the entire chunk. While specific reference is made to a 16 MB chunk and an operating granularity of 4 KB, any size chunk and a compression engine (109) operating at any level of granularity may be implemented in accordance with the systems and methods described herein. Operating on a smaller granularity as described herein may be beneficial in that the compression and decompression of data may be more specifically tailored, rather than compressing and decompressing data needlessly. In other words, a more targeted compression and decompression is achieved.

The compression engine (109) may also organize memory pages represented in a compaction table. For example, as will be described in connection with FIG. 4, pages may be grouped, re-sized, or combinations thereof to improve the compression ratio of a compaction table. Accordingly, the compression engine (109) may relocate, group, and re-size data, among other data management operations to improve the compression ratio of a compaction table. More detail concerning the operations of the compression engine (109) is given below in connection with at least FIGS. 2 and 4.

The memory device (104) may include a compression controller (110) that manages different aspects of the compression and decompression of data in the memory module (108). For example, the compression controller (110) may schedule data compression and data decompression. More specifically, the compression controller (110) may identify specific periods when memory requests are frequent and may direct the compression engine (109) to delay certain compression processes when memory demand requests are frequent. By comparison, when memory requests are not frequent, the compression controller (110) may direct the compression engine (109) to perform a number of compression processes.

The compression controller (110) may also determine which compression processes to perform on particular portions of data. For example, the compression controller (110) may detect a number of memory pages that are frequently accessed. For these frequently-accessed memory pages, the compression controller (110) may direct the compression engine (109) to implement a quicker compression process. By comparison, if the compression controller (110) detects that a number of memory pages are not frequently accessed, the compression controller (110) may direct the compression engine (109) to implement a more thorough compression process. More detail concerning the operations of the compression controller (110) is given below in connection with FIG. 6. While FIG. 1 depicts the memory module (108), the compression engine (109) and the compression controller (110) as being on one memory device (104), the components may be distributed across multiple circuit boards, packages or silicon chips, in an enclosure for example.

Figure 2:
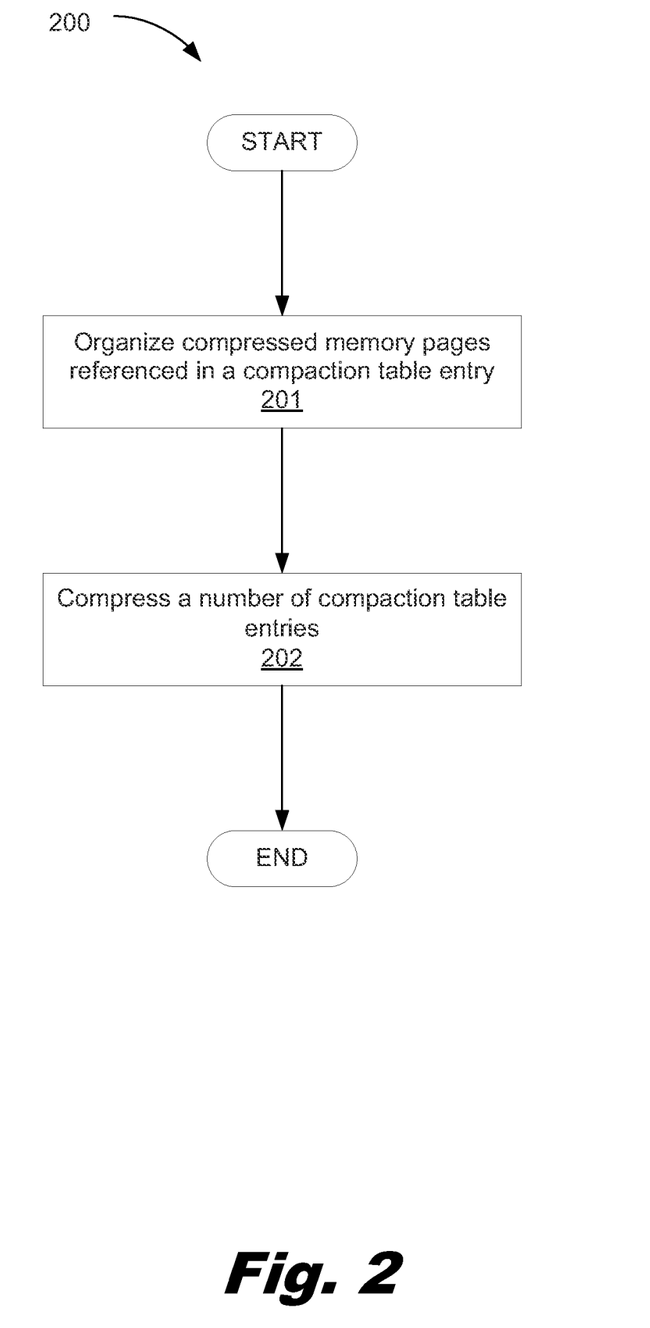
FIG. 2 is a flowchart of a method for compressing and compacting memory in a memory device, according to one example of the principles described herein.

FIG. 2 is a flowchart of a method (200) for compressing and compacting memory in a memory device (FIG. 1, 104), according to one example of the principles described herein. The memory pages referenced in a compaction table entry may be organized (block 201) to increase a compaction table compression ratio. More specifically, compressed memory pages of the same size may be grouped together. For example, compressed memory pages that are 4 KB may be grouped together, compressed memory pages that are 2 KB may be grouped together, and compressed memory pages that are 1 KB may be grouped together. Grouping similarly sized compressed memory pages may simplify the compaction table compression and may further reduce the size of the compaction table.

Organizing (block 201) the compressed memory pages may also include re-sizing a number of compressed memory pages to improve the compaction table compression ratio and thereby increase the efficiency of locating compressed memory pages. More specifically, a number of compressed memory pages may be re-sized to be of similar size. For example, given a 2 KB compressed memory page, a 1 KB compressed memory page, and a 2 KB compressed memory page, the 1 KB compressed memory page may be re-sized to 2 KB. Doing so may improve the efficiency of compression by creating longer runs of similarly-sized pages, thereby increasing the efficiency of compression such as RLE compression.

The method (200) may include compressing (block 202) a number of compaction table entries. As described above, the compaction table entries may include metadata relating to the memory chunks where data is stored. More specifically, the compaction table may include a number of fields that indicate information about blocks of memory in a compressed memory page. For example, a compressed memory page may include compressed blocks of 8 bytes, 4 bytes, 2 bytes, and 1 byte. Accordingly, the compaction table entry may include fields that indicate the respective size of the compressed blocks. Accordingly, the fields of the compaction table entries may be encoded, for example using run-length encoding (RLE) or other compression processes. Compressing compaction table entries may be beneficial in that it reduces the size of a compaction table as well as allowing offset calculations to be performed on the compressed compaction table. Performing offset calculations on the compressed compaction table may reduce the time to locate and access a compressed memory page.

While FIG. 2 indicates a particular order of the method (200), the blocks of the method (200) may be performed in any order. In some examples, a number of the blocks of the method (200) may be performed at the same time.

The method (200) described herein may be beneficial in that a size of a compaction table is reduced which may simplify the location of a memory page. Moreover the method (200) may improve compression ratios of the data stored on the memory pages and the compaction table metadata.

Figure 3:
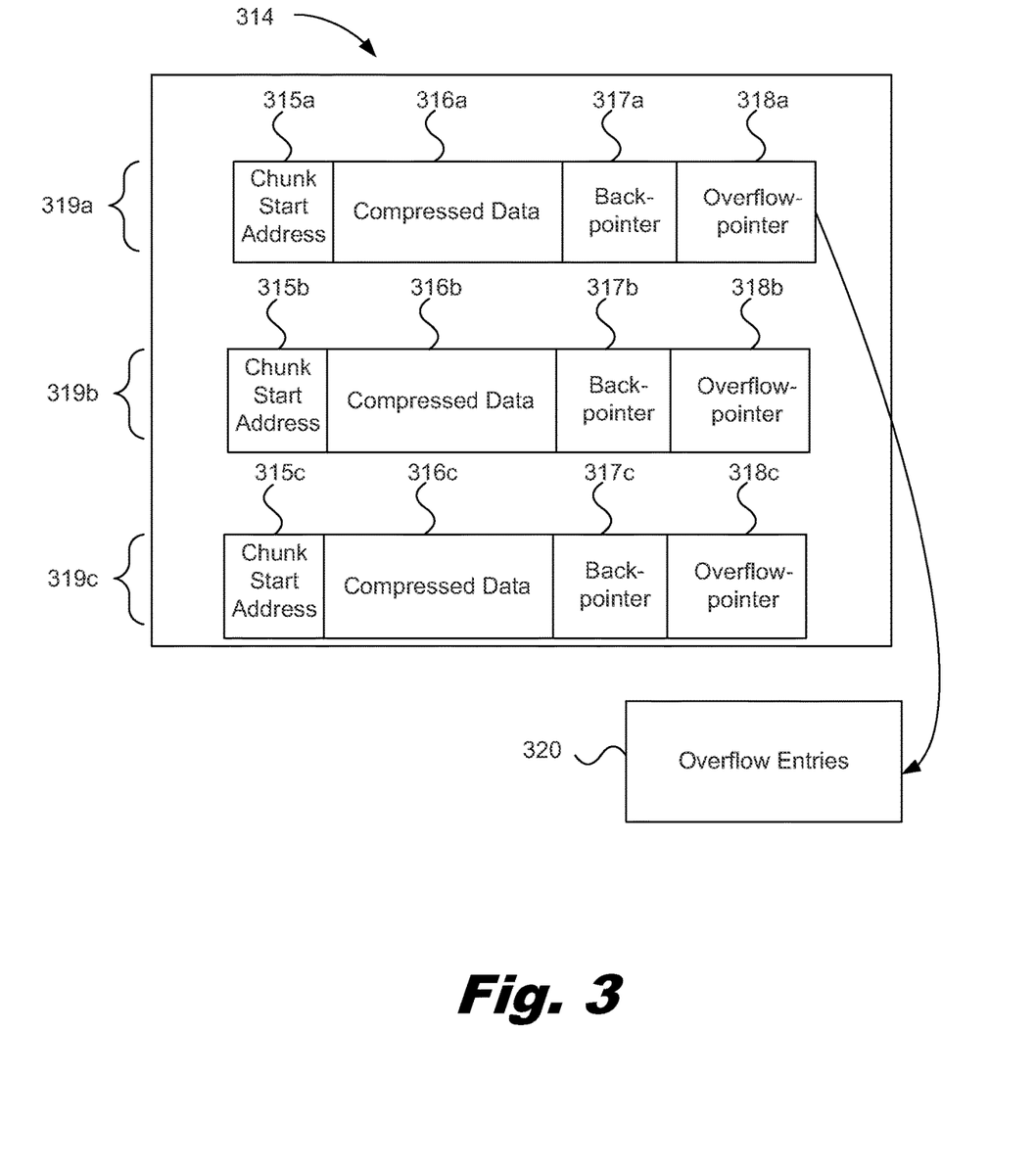
FIG. 3 is a diagram of a compaction table, according to one example of the principles described herein.

FIG. 3 is a diagram of a compaction table (314), according to one example of the principles described herein. A compaction table (314) may include a number of compaction table entries (319) that include metadata for a number of memory chunks. For example, a first compaction table entry (319a) may have a first identifier. Accordingly, the first compaction table entry (319a) may correspond to a compressed memory chunk stored in the memory module (FIG. 1, 108) having the first identifier. Similarly, a second compaction table entry (319b) and a third compaction table entry (319c) may have identifiers that associate the compaction table entries (319b, 319c) with corresponding compressed memory chunks stored in the memory module (FIG. 1, 108).

As described above, the compaction table entries (319) may include a number of fields. For example, the compaction table entries (319) may include a chunk start address field (315). The chunk start address field (315) may indicate a physical location of a first compressed memory page within a chunk. For example, the chunk start address field (315) may indicate the physical location of the first frame of a first block of compressed data in a memory page that is stored in the memory module (FIG. 1, 108).

The compaction table entries (319) may include a compressed data field (316). The compressed data field (316) may indicate the location of subsequent pages of compressed data in a memory chunk that is stored in the memory module (FIG. 1, 108). The compressed data fields (316) may be in compressed form. For example, the compressed data (316) may include a number of block sizes of the subsequent pages of compressed data to identify the location of the memory pages within the memory chunk.

The compressed data fields (316) may include the data that was compressed as described in connection with FIG. 2. More specifically, a compressed memory page may include compressed blocks of different sizes. Using the method (FIG. 2, 200) described in connection with FIG. 2, the blocks may be re-arranged, re-sized, or combinations thereof, and compressed using a process such as run-length encoding.

The compaction table entries (319) may include a number of back-pointers (317) to identify formatting information for a number of fields in a compaction table entry (319). More specifically, the back-pointer (317) of a compaction table entry (319) may include space reserved in a compaction table entry (319) where a user might include particular formatting details of a memory chunk indicated by the compressed data field (316). These formatting details may be indicated by the back-pointer (317).

A compaction table entry (319) may include a number of overflow-pointers (318) to locate additional compressed data. The additional compressed data may be located in an overflow entries field (320). The overflow entries field (320) may contain compressed metadata that did not fit in the compressed data field (316).

A more detailed explanation of the overflow pointer (318) and overflow entry field (320) is given as follows. A compaction table (314) may facilitate entries (319) of different lengths. For simplicity, in this example, two lengths will be described, a first (and shorter) length and a second (and longer) length. To simplify data compression and data decompression, the compaction table (314) may allow compaction table entries (319) of the first length be stored in the compaction table (314). For compaction table entries (319) that are longer than the first length, additional data may be stored in the overflow entries field (320). Accordingly, for compaction table entries (314) that are the first length, the metadata may be included in the compaction table entry (319), for example in the compressed data field (316). By comparison, compaction table entries (319) that are the second length may contain too much information to be stored in the compaction table (314) on account of the second length being longer than the first length. Accordingly, the extra data may be stored in the overflow entries field (320), and the overflow-pointer (318) may point a processor (FIG. 1, 101) or the compression engine (FIG. 1, 109) to the overflow entries field (320) to locate the additional metadata.

Including an overflow pointer field (318) and an overflow entries field (320) may be beneficial in that it simplifies data compression and data decompression by creating a uniform compaction table entry (319) length without limiting information that can be represented in a compaction table entry (319). In some examples, the compaction table (314) may be organized based on the granularity of a memory chunk.

Similarly, the compaction table (314) may be organized based on a granularity of a memory page.

Figure 4:
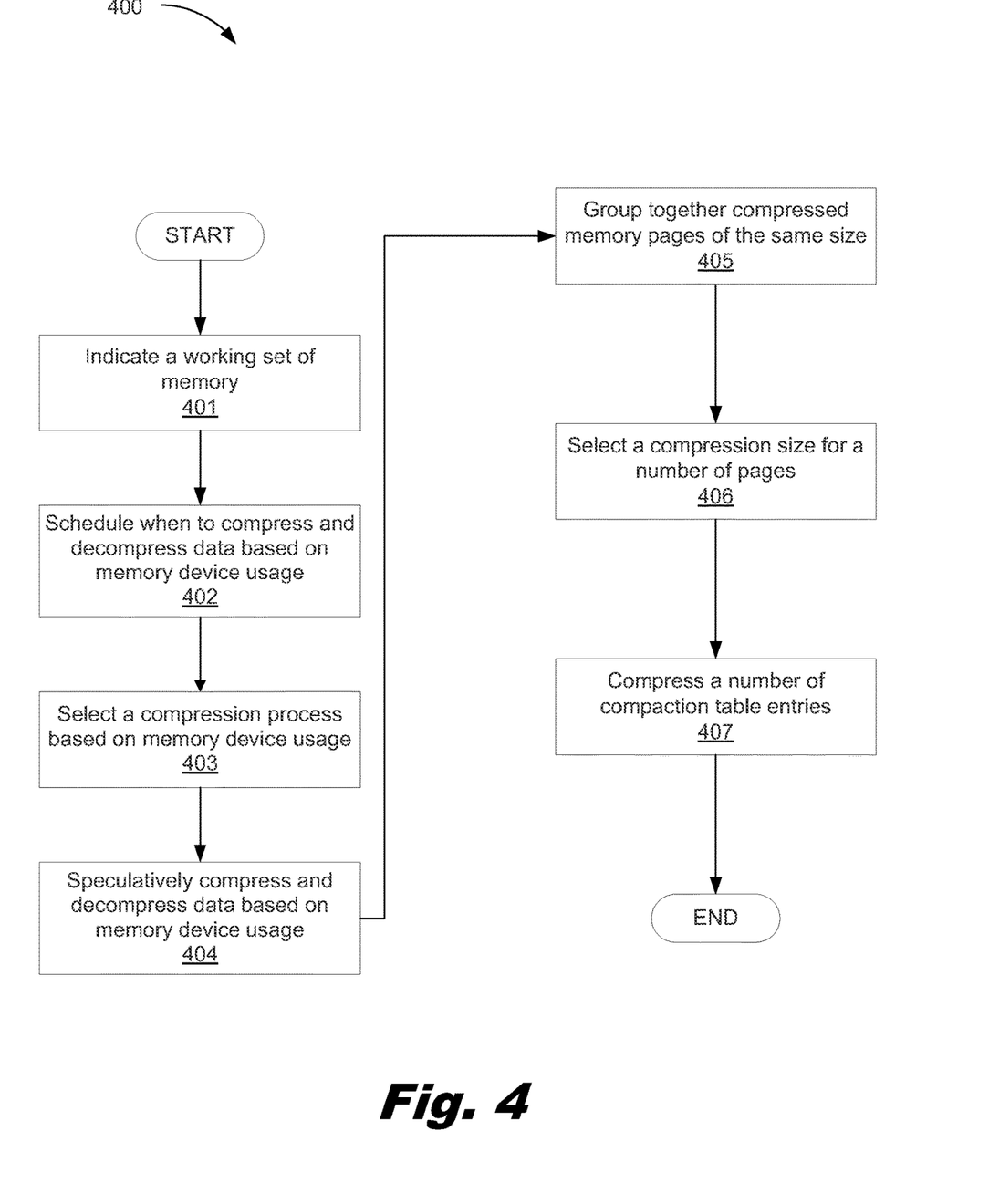
FIG. 4 is a flowchart of another method for compressing and compacting memory in a memory device, according to another example of the principles described herein.

FIG. 4 is a flowchart of another method (400) for compressing and compacting memory in a memory device (FIG. 1, 104), according to another example of the principles described herein. The method (400) may include managing data compression and data decompression based on memory device usage. For example, the system (FIG. 1, 100) may use the compaction table entries to locate, compress, decompress or otherwise access memory pages. Managing data compression and data decompression may include scheduling when to compress and decompress data. For example, the system (FIG. 1, 100) may avoid compressing data and decompressing data when the memory device (FIG. 1, 104) is experiencing many access requests. By comparison, the system (FIG. 1, 100) may compress data and decompress data when the memory device (FIG. 1, 104) is not experiencing many access requests.

Data compression and data decompression management may also include selecting a compression process, a decompression scheduling policy, or combinations thereof based on memory device usage. For example, the system (FIG. 1, 100) may perform a quicker compression process when the memory device (FIG. 1, 104) is experiencing many access requests. By comparison, the system (FIG. 1, 100) may compress data and decompress data when the memory device (FIG. 1, 104) is not experiencing many access requests.

Managing data compression and data decompression may be based on access requests. Management of compression and decompression may be based on other metrics. For example, the system (FIG. 1, 100) may manage data compression and data decompression based on whether the memory device (FIG. 1, 104) is in a stage where high performance is desired. More detail concerning the management of data compression and decompression using the compaction table is given below in connection with blocks 401, 402, 403 and 404.

The method (400) may include indicating (block 401) a working set. As used herein, the term "working set" may include memory pages that are being accessed by an application for a time interval. For example, the memory module (FIG. 1, 108) may include a large memory footprint, while a smaller portion of the memory module (FIG. 1, 108) is accessed at any given time. As will be described below, whether memory is part of the working set may indicate when and how to compress and decompress the data. Accordingly, the system (FIG. 1, 100) may include logic to indicate (block 401) a working set of memory. In some examples, indicating (block 401) a working set of memory may include making a prediction about what memory will be the working set.

The system (FIG. 1, 100) may schedule (block 402) when to compress and decompress data based on memory device usage. More specifically, data compression and decompression may be computationally expensive and may make a memory device (FIG. 1, 104) unavailable for on-demand access requests, which may degrade system (FIG. 1, 100) performance. Accordingly, the data compression and decompression may be scheduled (block 402) based on memory device usage. For example, compression and decompression processes may be delayed when access demands are frequent. In this example, the data may be temporarily stored in a buffer on the memory device (FIG. 1, 104) for compression or decompression when access requests are sparse. Alternatively, in this example, the data may be compressed in the background.

A compression process may be selected (block 406) based on memory device (FIG. 1, 104) usage. For example, as described above, data compression and decompression may be computationally expensive and may make a memory device (FIG. 1, 104) unavailable for on-demand access requests, which may degrade system (FIG. 1, 100) performance. Accordingly, the system (FIG. 1, 100) may select (block 403) a quicker compression process to compress data when memory access requests are frequent. Selecting a quicker compression process to facilitate memory access requests may reduce compression time, decrease latency, and increase performance for on-demand memory requests. Then, when the frequency of access requests has tapered, the system (FIG. 1, 100) may select (block 403) a slower, more comprehensive compression process to compress the data.

In some examples, the system (FIG. 1, 100) may speculatively compress (block 404) and decompress data based on memory device (FIG. 1, 104) usage. The decompressed data can be stored temporarily on the memory device in a separate buffer or cache space, which can be managed to keep the frequently used data. For example, as described above, a subset of memory may be accessed frequently. This subset of memory may be referred to as a working set. In some examples, a working set may be referred to as "hot" memory. By comparison, memory that is not part of the working set, and that is accessed less frequently may be referred to as "cold" memory. As this memory is used more often, it may be compressed and decompressed more often. Accordingly, the system (FIG. 1, 100) may indicate the working set and decompress the data for usage, before a request is received. In this manner, when the subset of memory that is accessed more frequently is requested, reduced decompression latency may be observed.

In addition to being speculatively decompressed, the working set may also be compressed or decompressed using a quicker decompression process to further reduce the decompression latency. By comparison, "cold" memory, or memory that is accessed less frequently, may contribute less to compression latency and accordingly may be compressed using a more thorough, slower compression process.

Compressed memory pages in a memory chunk may be grouped (block 405) together. For example, a memory chunk may include memory pages of 4 KB, 2 KB, 1 KB, 2 KB, and 4 KB. In this example, the memory pages may be re-arranged based on size. In other words, the memory pages may be organized as follows 4 KB, 4 KB, 2 KB, 2 KB, and 1 KB to allow the compaction table entry (FIG. 3, 319) for this memory chunk to be compressed more simply. For example, using run-length encoding, the pages organized as 4 KB, 4 KB, 2 KB, 2 KB, and 1 KB may take up less space after compression as described in connection with FIG. 2.

In some examples, a compression size for a number of memory pages may be selected (block 406) to improve a compaction table entry (FIG. 3, 319) compression ratio. For example, a memory chunk may include consecutive memory pages having sizes of 2 KB, 1 KB, and 2 KB. In this example, a size of 2 KB may be selected (block 406) as a compressed page size. Accordingly, the compressed pages may now have sizes of 2 KB, 2 KB, and 2 KB. Re-sizing a number of page sizes may be beneficial by simplifying the compaction table entries for these pages.

The method (400) may include compressing (block 407) a number of compaction table entries (FIG. 3, 319). This may be performed as described in connection with FIG. 2.

While FIG. 4 indicates a particular order of the blocks of the method (400), the blocks of the method (400) may be performed in any order. In some examples, a number of the blocks of the method (400) may be performed at the same time.

The method (400) may be beneficial in that selecting when and how to compress data based on memory device (FIG. 1, 104) usage may reduce compression latency without disrupting on-demand memory access requests.

Figure 5:
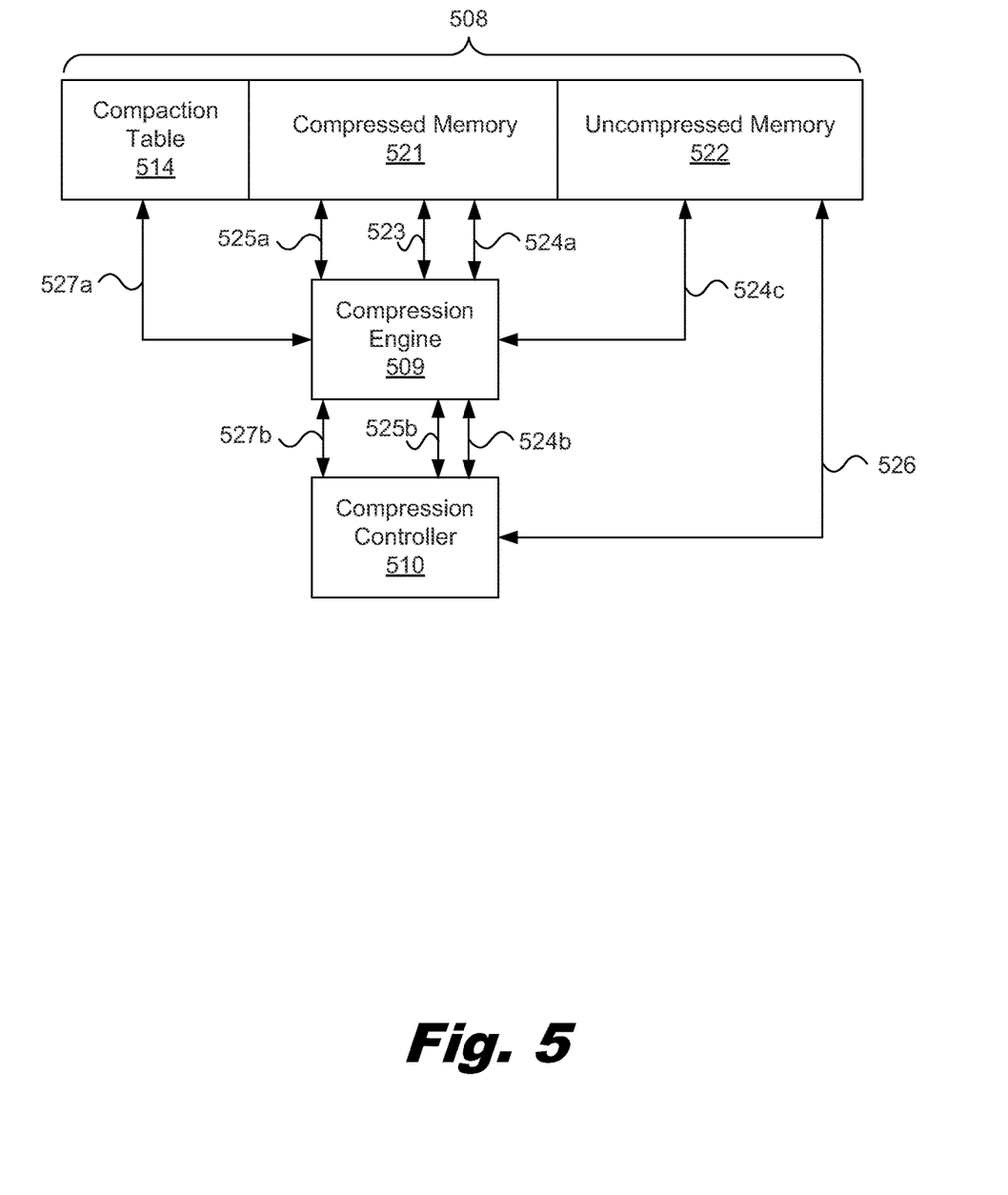
FIG. 5 is a diagram of a system for compressing and compacting memory in a memory device, according to one example of the principles described herein.

FIG. 5 is a diagram of a system for compressing and compacting memory in a memory device (FIG. 1, 104), according to one example of the principles described herein. More particularly, FIG. 5 depicts a number of data flows between the memory module (508), the compression engine (509), and the compression controller (510).

In a first data flow memory chunks may be retrieved from compressed memory (521) as indicated by the arrow (523). The compressed memory (521) may include compressed data in memory pages. Upon retrieving the compressed memory chunks, the compression engine (509) may compress and/or decompress the memory chunks. For example, the compression controller (510) may indicate whether a memory subset is part of a working set, or that on-demand requests are frequent. In some examples, this information may also be passively acquired by the memory device. For example, the memory device may monitor and predict the working set and may predict an on-demand request frequency. Based on this information, the compression controller (510) may direct the compression engine (509) when and how to compress the data. A more specific example of the first data flow is given as follows. When aggressively compressed memory chunks become hot, they may be retrieved by the compression engine and may be decompressed, or may be compressed using a quicker compression process, both of which reduce compression latency.

In a second data flow, data may be retrieved from the compressed memory (521) as indicated by the arrow (524a). The data may be retrieved based on a memory request, or based on information received from the compression controller (510) (i.e., that the memory is to be speculatively decompressed, compressed using a less stringent compression process, or compressed using a more stringent compression process). In this example, the compression controller (510) may direct the compression engine (509) to compress, or decompress the data as indicated by the arrow (524b). In some examples, the data may also be decompressed and stored as uncompressed data as indicated by the arrow (524c).

In a third data flow (525) the compression engine (509) may receive instruction from the compression controller (510) to retrieve "cold" compressed memory as indicated by the arrow (525b). Accordingly, the compression controller (510) may retrieve the cold memory as indicated by the arrow (525a). As described above, cold memory may be memory that is accessed infrequently. In this example, the compression engine (509) may simply decompress a requested block to serve the memory request, and the rest of the cold memory chunk may remain compressed.

In a fourth data flow (526) uncompressed memory (522) that includes uncompressed data may be accessed (526) via a memory request received by the compression controller (510). In this example, compression and decompression by the compression engine (509) may be avoided.

In a fifth data flow (527), the compression engine (509) may be directed by the compression controller (510), as indicated by the arrow (527b), to update the compaction table (514) as indicated by the arrow (527a). For example, when changing compression techniques used on a memory chunk, the compaction table (514) may be updated to reflect the change. In some examples, the compressed memory (521) and the uncompressed memory (522) may be separately addressable memory regions in the main memory. In another example, the uncompressed memory (522) may be a cache (that may be transparent to other processes) of the compressed memory (521).

Figure 6:
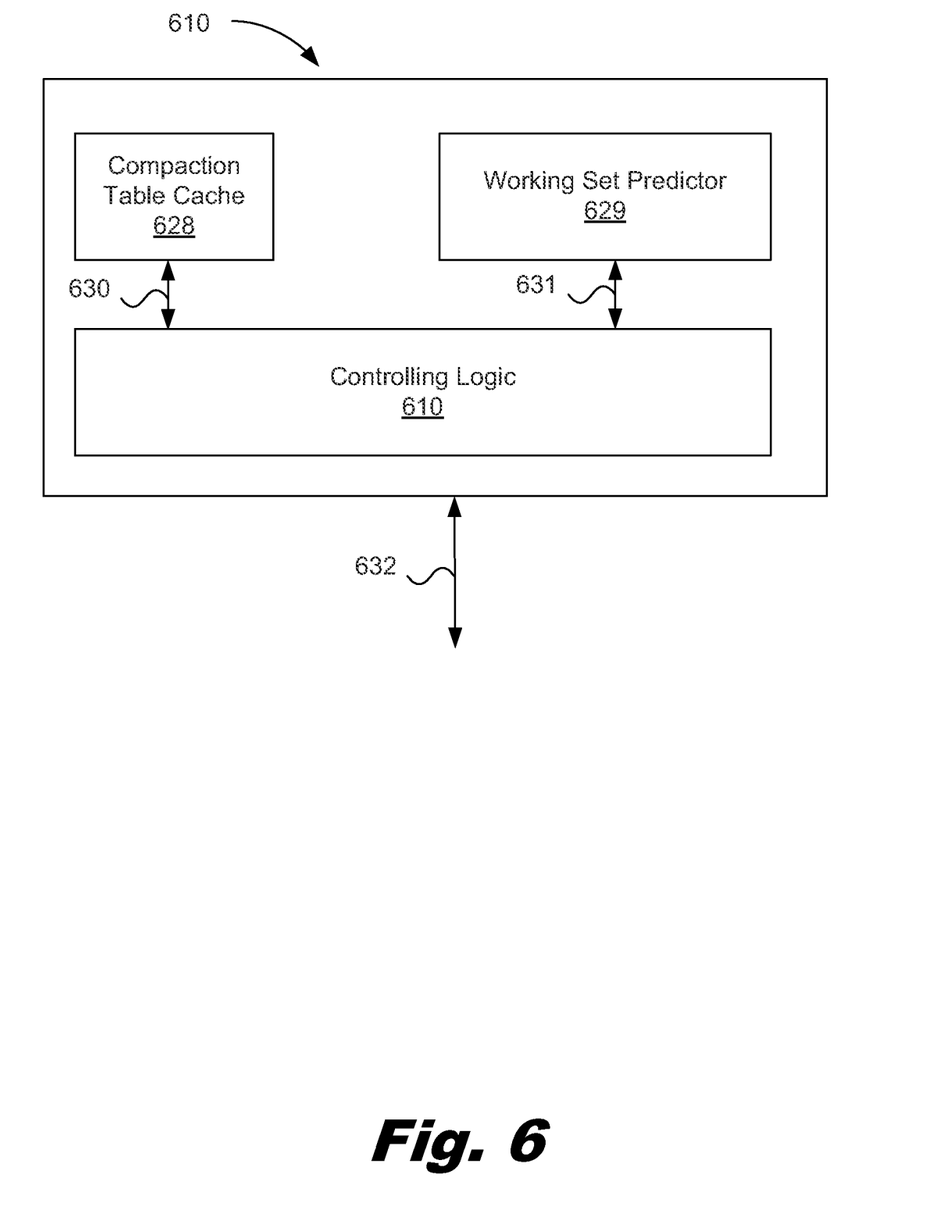
FIG. 6 is a diagram of a compression controller, according to one example of the principles described herein.

FIG. 6 is a diagram of a compression controller (610), according to one example of the principles described herein. The compression controller (610) may interface with a processor (FIG. 1, 101) of the system (FIG. 1, 100) as indicated by the arrow (632). Via the interface, the compression controller (610) may receive a memory access request. Similarly, via the interface, the compression controller (610) may return data for use by the system (FIG. 1, 100).

The compaction table (610) may include a compaction table cache (628) to decrease the latency for retrieval of metadata relating to the memory chunks. For example, as described above, while a compaction table (FIG. 3, 314) may be stored in the memory module (FIG. 1, 108) a portion of the compaction table (FIG. 3, 314) may be stored in the compaction table cache (628). For example, the compaction table cache (628) may store compaction table entries (FIG. 3, 319) that correspond to portions of the memory chunk that are accessed frequently, or so called "hot" memory. Storing portions of the compaction table (FIG. 3, 314) in the compaction table cache (628) may be beneficial in that those sections of memory that are used most frequently may be easily accessed via the compaction table cache (628) which may increase overall system (FIG. 1, 100) performance. In some examples, the compaction table cache (628) may be a volatile memory type cache and may be implemented using a register-based array or other memory elements.

The compression controller (610) may also include a working set predictor (629). As described above, the working set may refer to a subset of memory in the memory module (FIG. 1, 108) that is accessed for a time interval. The working set predictor (629) may predict which subset of memory is the working set. For example, the working set predictor (629) may collect information on a number of time intervals and may predict the working set for the next interval.

In some examples, the working set predictor (629) may manage mis-predictions of a working set. For example, a working set that is incorrectly indicated as a cold memory chunk may be compressed using a more thorough compression process. Accordingly, on-demand performance may be reduced and processor power may be used to needlessly compress using an aggressive compression process.

By comparison, if a number of memory chunks are incorrectly identified as "hot" memory, many chunks may be compressed or decompressed using a low compression ratio, while receiving little use on account of the memory actually being "cold." This may cause degraded performance of overall memory capacity expansion.

To overcome these mis-predictions, the working set predictor (629) may predict whether a subset of memory is "hot" or "cold" based on a threshold. For example, the working set predictor (629) may implement a memory access threshold. Any memory subset that is requested more times than the access threshold may be identified as a "hot" memory subset and any subset that is not requested less than the access threshold may be identified as a "cold" memory subset.

The compression controller (610) may also include controlling logic (610) that acts as an interface between the memory module (FIG. 1, 108) and the processor (FIG. 1, 101). As the compaction table (FIG. 3, 314) changes, for example due to a change in a compression process, or additional information being indicated in an overflow entry (FIG. 3, 320), the controlling logic (610) may update the compaction table cache (628) as indicated by the arrow (630). Similarly, when a request is made to access "hot" memory, the compaction table cache (628) may retrieve an entry for the memory as indicated by the arrow (630).

Similarly, the controlling logic (610) may receive a request to access memory via the interface. The controlling logic (610) may then query the working set predictor (629) whether the requested memory page is part of the working set as indicated by the arrow (631). In response, the working set predictor (629) may indicate the predicted working set for the next interval as indicated by the arrow (631). It should be noted that the controlling logic (610), the working set predictor (629), or combinations thereof may be implemented using a processor on the memory module (FIG. 1, 108).

Methods and systems for compressing and compacting memory on a memory device may have a number of advantages, including: (1) expanding memory capacity without adding memory devices; (2) providing memory host-transparent compression, compaction, and decompression; (3) improving space and time efficiency of locating compressed data; and (4) reducing performance overhead and improving memory expansion benefits.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method for compressing and compacting memory on a memory device, comprising:
   organizing a number of compressed memory pages referenced in a number of compaction table entries based on a size of the number of compressed memory pages; and
   compressing the number of compaction table entries, in which a compaction table entry comprises a number of fields.

2. The method of claim 1, in which a compaction table entry includes a number of back-pointer fields, each back-pointer field to indicate formatting information for the compaction table entry.

3. The method of claim 1, in which the compaction table entry includes a number of overflow pointers, each overflow pointer to indicate a location of additional compressed data.

4. The method of claim 1, in which organizing of the number of compressed memory pages further comprises grouping together the number of compressed memory pages of a same size.

5. The method of claim 1, in which organizing of the number of compressed memory pages further comprises selecting a compression size for the number of compressed memory pages.

6. The method of claim 1, further comprising managing data compression and data decompression based on usage of the memory device.

7. The method of claim 6, in which managing data compression and decompression comprises scheduling when to compress and decompress based on the usage of the memory device.

8. The method of claim 6, in which managing data compression and decompression comprises selecting a compression process based on the usage of the memory device.

9. The method of claim 6, in which managing data compression and decompression comprises speculatively compressing and decompressing data based on the usage of the memory device.

10. The method of claim 1, in which the compaction table is organized based on memory chunk granularities, memory page granularities, or combinations thereof.

11. The method of claim 1, wherein organizing the compressed memory pages comprises grouping the compressed memory pages of a same size together.

12. The method of claim 1, further comprising resizing the memory pages to a same size.

13. A computer program product for compressing and compacting memory on a memory device, the computer program product comprising:
   a non-transitory computer readable storage medium comprising computer usable program code embodied therewith, the computer usable program code to, when executed by a processor:
   schedule data compression and decompression based on memory device usage;
   group compressed memory pages of a same size together, in which the memory pages are represented in a compaction table;
   resize a number of memory pages to the same size;
   and compress a number of fields of a compaction table entry.

* * * * *